United States Patent
Itako

(10) Patent No.: US 6,754,559 B2
(45) Date of Patent: Jun. 22, 2004

(54) AUTOMATIC VENDING MACHINE AND SALES METHOD THEREOF

(75) Inventor: Eiji Itako, Sakado (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 149 days.

(21) Appl. No.: 10/228,349

(22) Filed: Aug. 26, 2002

(65) Prior Publication Data

US 2003/0050890 A1 Mar. 13, 2003

(30) Foreign Application Priority Data

Sep. 11, 2001 (JP) ........................................ 2001-275100

(51) Int. Cl.$^7$ ................................................ G05F 17/00
(52) U.S. Cl. ........................ 700/237; 235/381; 902/26; 705/17
(58) Field of Search ....................... 379/91.01; 235/381, 235/382, 382.5; 380/24.1; 902/26; 700/237; 705/17, 18, 41, 44

(56) References Cited

FOREIGN PATENT DOCUMENTS

| JP | 04-199491 | 7/1992 |
|----|-----------|--------|
| JP | 06-176251 | 6/1994 |
| JP | 10-232965 | 9/1998 |

*Primary Examiner*—Donald P. Walsh
*Assistant Examiner*—Jeffrey A. Shapiro
(74) *Attorney, Agent, or Firm*—Welsh & Katz, Ltd.

(57) ABSTRACT

An automatic vending machine which is highly reliable and which does not require any complicated operations when performing sales using a non-contact IC card, and a sales method therefor are provided. When a non-contact IC card is held up for a first time against an automatic vending machine in standby mode, monetary amount information on the card is displayed on a display section without any monetary amount information being extracted from the card, whereupon the lamps of product selection buttons corresponding to products which are available for sale are illuminated. After a product has been selected, the non-contact IC card is held up for a second time, whereupon payment processing is performed such that the monetary amount information on the card is updated.

7 Claims, 5 Drawing Sheets

AUTOMATIC VENDING MACHINE AND SALES METHOD THEREOF

BACKGROUND OF THE INVENTION

1. Field of the Invention

The present invention relates to an automatic vending machine which enables merchandise sales processing using a non-contact IC card and a sales method thereof, and more particularly to an automatic vending machine which enables highly reliable merchandise sales processing without complicating operations, and a sales method thereof 2. Description of the Related Art Automatic vending machines which enable the purchasing of products using a non-contact IC card have been proposed in the prior art.

In Japanese Patent Application Laid-Open No. 6-176251, when a user depresses a set button on an automatic vending machine, products become selectable after the price of a single product or the entire amount is deducted in advance from monetary amount information which is stored on the card of the user. In a case where the entire amount is deducted from the monetary amount information stored on the card, the user selects a product, and following payment for the selected product, the balance which remains following subtraction of the cost of the product that was paid for from the entire amount of the monetary amount information stored on the card, which was deducted from the card in advance, is refunded to the card.

In Japanese Patent Application Laid-Open No. 10-232955, product selection becomes possible when the user depresses a purchase button or when a human-detecting sensor detects the user. After the user has selected a product, the cost is deducted from the card and the product is dispensed.

However, in a system in which an amount of money is deducted from the card prior to purchase, as in Japanese Patent Application Laid-Open No. 6-176251, the product cost may not be returned when the user does not purchase the product.

Further, upon selection of a product in Japanese Patent Application Laid-Open No. 10-232955, the user may select a product which costs more than the amount of money on the card.

SUMMARY OF THE INVENTION

It is therefore an object of this invention to provide an automatic vending machine in which a user can check which products may be purchased prior to the selection of a product and in which payment is deducted from a card after the user has selected a desired purchase, and to provide a sales method thereof In order to achieve the aforementioned object, an automatic vending machine of the invention described in claim 1 comprises: short range communication means for performing short range communication with a communication medium which is carried by a user; reader/writer means for reading from the communication medium via the short range communication means an authentication code for this communication medium and monetary amount information stored on this communication medium, and for rewriting the monetary amount information stored on the communication medium following a sale of a product; storage means for temporarily storing the authentication code and the monetary amount information read out from the communication medium by the reader/writer means; product dispensation means for dispensing a product; and control means in which a judgment is made as to whether or not the sale of a product is possible on the basis of the authentication code and monetary amount information read out from the communication medium by the short range communication means, whereupon, if the sale is possible, this authentication code and monetary amount information are stored in the storage means and the selection of a product is awaited, and in which the authentication code and monetary amount information of the communication medium are read for a second time by the short range communication means following the selection of a product, whereby, if the authentication code and monetary amount information read out for the second time and the authentication code and monetary amount information stored in the storage means match, the monetary amount information stored in the communication medium is updated to monetary amount information obtained by deducting a price of the selected product from the monetary amount information which was read for the second time, and, following the update of the monetary amount information, the product is dispensed by the product dispensation means.

The invention in claim 2, according to the invention in claim 1, is constituted such that when the product cannot be dispensed by the product dispensation means, the authentication code of the communication medium is read from the communication medium for a second time, and, if the read out authentication code and the authentication code stored in the storage means match, the deducted monetary amount information is added to the monetary amount information on the communication medium.

Thereby, when a product cannot be dispensed due to the occurrence of a malfunction in the automatic vending machine such as a product blockage, the price of the product that could not be dispensed may be refunded to the communication medium. Further, in the invention of claim 3, according to the invention in claim 1, the communication medium comprises a non-contact IC card, and the short range communication means reads from the non-contact IC card an authentication code of the non-contact IC card and monetary amount information stored on the non-contact IC card when the non-contact IC card is within an effective distance of radio waves emitted from the short range communication means, and rewrites the monetary amount information stored on the non-contact IC card following the sale of a product. In the invention in claim 4, according to the invention in claim 3, an effective distance from radio waves emitted by the short range communication means is several centimeters.

In the invention of claim 5, according to the invention in claim 1, the communication medium comprises a portable communication terminal having infrared communication means, and wherein the short range communication means performs infrared communications with the infrared communication means of the portable communication terminal to read from the portable communication terminal an authentication code of the portable communication terminal and monetary amount information stored on the portable communication terminal, and rewrites the monetary amount information stored in the portable communication terminal following the sale of a product.

Further, the invention in claim 6 is a sales method of an automatic vending machine for selling a product by performing payment processing by means of short range communication with a communication medium which is carried by a user, comprising: a first step of reading an authentication code of the communication medium and monetary amount information stored on the communication medium from the communication medium; a second step of judging whether or not the sale of a product is possible based on the authentication code and monetary amount information read in the first step; a third step of, if the sale of a product is possible in the second step, storing the authentication code and monetary amount information and awaiting the selection of a product; a fourth step of selecting a product; a fifth step of reading the authentication code and monetary amount information of the communication medium for a second time following the selection of a product in the fourth step; a sixth step of comparing the authentication code and monetary amount information which were read for a second time in the fifth step and the stored authentication code and monetary amount information; a seventh step of, if the authentication code and monetary amount information which were read for a second time and the stored authentication code and monetary amount information match in the sixth step, updating the monetary amount information stored on the communication medium to monetary amount information obtained by deducting the price of the selected product from the monetary amount information which was read for a second time; and an eighth step of dispensing the product following the update of the monetary amount information in the seventh step.

Further, in the invention of claim 7, according to the invention in claim 6, the method further comprises: a ninth step of, if a product cannot be dispensed in the eighth step, reading the authentication code of the communication medium from the communication medium for a second time; and a tenth step of, if the authentication code read out in the ninth step and the stored authentication code match, adding the price of the product which could not be dispensed to the monetary amount information on the communication medium.

Thus, according to this invention, when a non-contact IC card is held up for the first time against an automatic vending machine which is in standby mode, the automatic vending machine simply displays the balance of the card and indicates the products available for sale without extracting any of the monetary amount information from the non-contact IC card. When the non-contact IC card is held up for a second time following the selection of a product, payment processing is performed such that the monetary amount information on the non-contact IC card is updated, and hence, no unnecessary payment deductions are made from the cards of users other than a user with a definite desire to purchase a product, as a result of which highly reliable card sales can be realized.

Moreover, when a product cannot be dispensed due to a product blockage or the like and in spite of the fact that payment has been extracted from the card, processing to refund the payment is performed by holding the card up to the automatic vending machine for a second time, whereby card sales with an even higher level of reliability can be realized.

Furthermore, the antenna section can be easily attached to a banknote identifying machine or the like, and thus an existing automatic vending machine can be made to respond easily to slight improvements. The automatic vending machine may also be used with cash, and therefore product sales can be realized with ease.

DESCRIPTION OF THE PREFERRED EMBODIMENTS

An embodiment of the automatic vending machine according to this invention will be explained in detail below with reference to the attached drawings.

Figure 1:
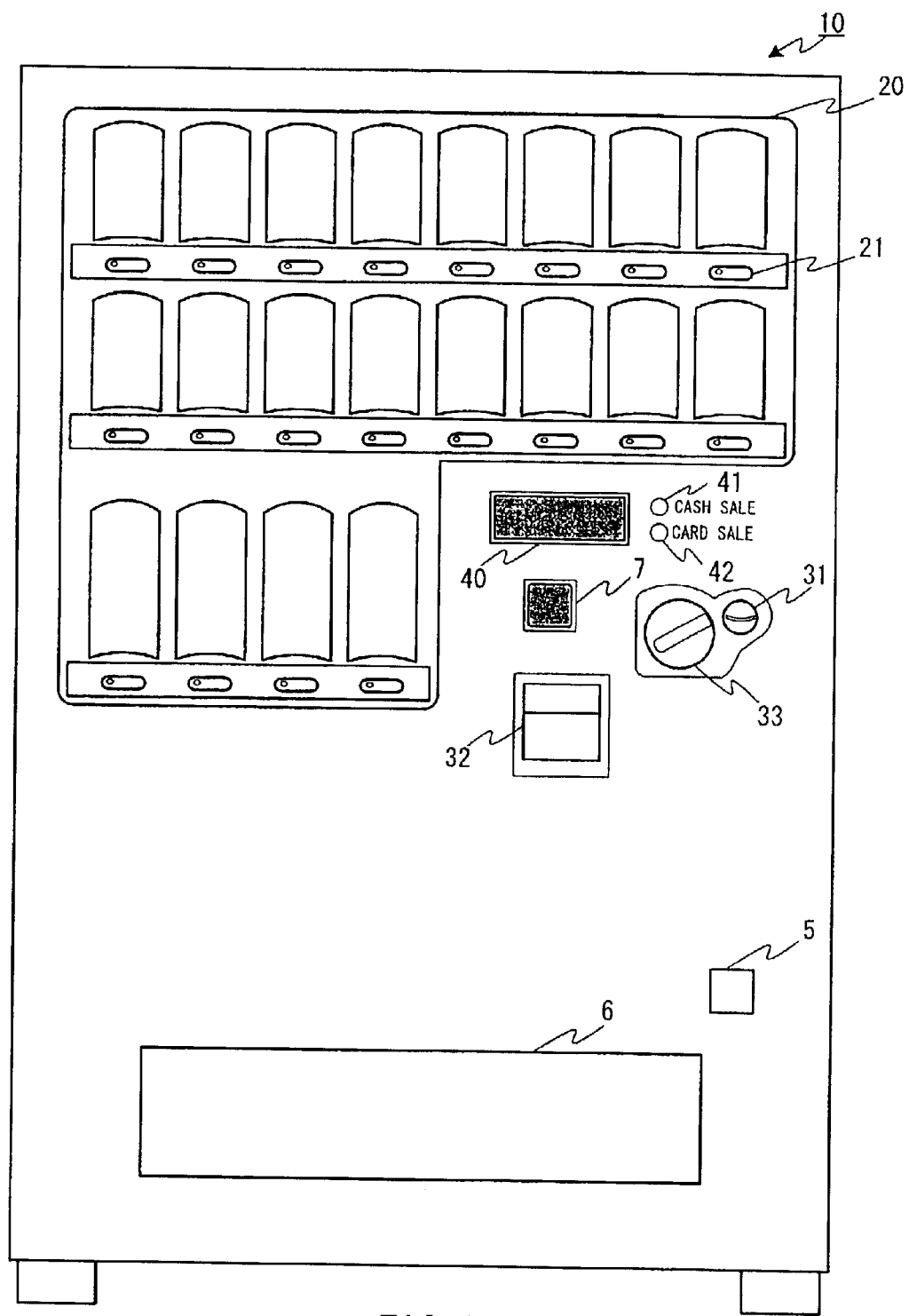
FIG. 1 is a view showing an example of the appearance of the external constitution of an automatic vending machine according to this invention.
Figure 2:
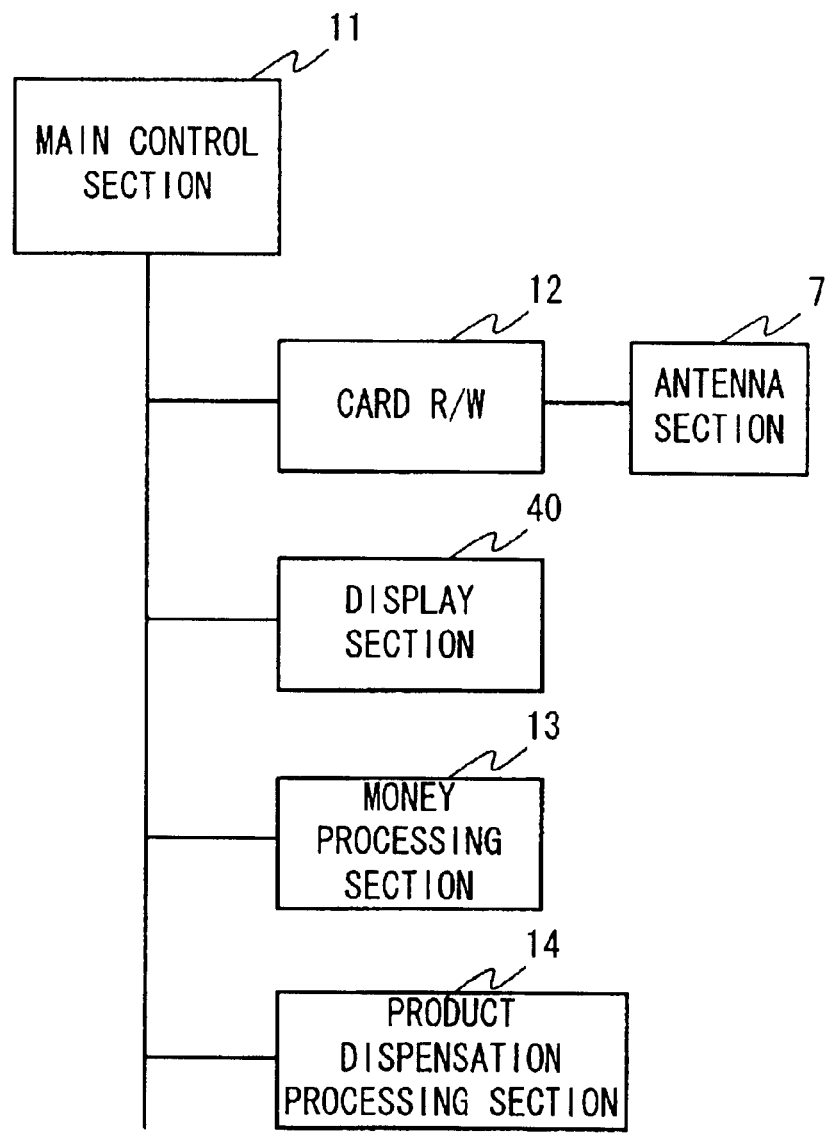
FIG. 2 is a block diagram showing an example of the constitution of the main components for controlling sales using a non-contact IC card from among a control circuit of the automatic vending machine according to this invention as shown in FIG. 1.

FIG. 1 is a view showing an example of the outer appearance of the automatic vending machine according to this invention, and FIG. 2 is a block diagram showing an example of the constitution of the main components for controlling sales using a non-contact IC card from among the control circuit of the automatic vending machine in FIG. 1.

In FIG. 1, an automatic vending machine 10 is an automatic vending machine which performs product sales by means of cash and which is also capable of product sales using a non-contact IC card. The automatic vending machine 10 comprises a product display section 20 in which product samples are displayed and a plurality of product selection buttons 21 are arranged so as to correspond to each product, a coin insertion slot 31 for inserting coins, a banknote insertion slot 32 for inserting banknotes, a return lever 33 for returning change, a display section 40 for displaying various types of information such as monetary amount information, sales mode lamps 41, 42 for indicating the current sales mode, a coin return port 5, a product dispensation port 6, and an antenna section 7 for supplying power to the non-contact IC card and performing data read/write operations.

A lamp is provided on the product selection buttons 21 for indicating that the corresponding product is available for sale. This lamp lights up when the corresponding product becomes available for sale in response to the value of the product (cash or monetary amount information stored on the non-contact IC card) being inserted into the automatic vending machine 10.

The antenna section 7 emits radio waves constantly and performs communications by supplying power to a non-contact IC card placed within the area of effectiveness of the radio waves. Here, the area of effectiveness of the radio waves emitted by the antenna section 7 is set at a range of several centimeters from the antenna section 7, whereby communications with the non-contact IC card are not performed when a user purposely holds the non-contact IC card away from the antenna section 7. Placing the non-contact IC card within the area of effectiveness of the radio waves emitted by the antenna section 7 will be referred to hereinbelow as "holding the non-contact IC card up to the antenna section 7".

The sales mode lamps 41, 42 display whether the automatic vending machine 10 is in cash sales mode (whereby sales mode lamp 41 is illuminated) in which sales are performed using cash, or card sales mode (whereby sales mode lamp 42 is illuminated) in which sales are performed using a non-contact IC card. This sales mode is determined by an initial operation which is performed in respect of the automatic vending machine 10 which is in standby mode. If cash is inserted through the coin insertion slot 31 or the banknote insertion slot 32, then cash sales mode is determined, whereas if a non-contact IC card is held up to the antenna section 7, card sales mode is determined.

Note that a sales mode selection button for selecting the sales mode may also be provided as a separate component on the automatic vending machine 10, whereby a user operates this sales mode selection button to determine the sales mode.

Further, if the automatic vending machine 10 is to be capable of sales using non-contact IC cards only, then the coin insertion slot 31, banknote insertion slot 32, return lever 33 and coin return port 5 become unnecessary.

As is illustrated in FIG. 2, the automatic vending machine 10 is constituted by a main control section 11, a card reader/writer (R/W) 12, a money processing section 13, a product dispensation processing section 14, a display section 40, and the antenna section 7.

The main control section 11 performs overall control of the sale of products by controlling each section of the automatic vending machine 10. The card reader/writer 12 is connected to the antenna section 7, and performs read processing and write processing of data from the non-contact IC card which is held up to the antenna section 7. The money processing section 13 performs processing for accepting money corresponding to the value of a product, returning change, and so on. The product dispensation processing section 14 performs product dispensation processing based on control signals from the main control section 11. The display section 40 displays various types of information (the amount of money inserted etc.) relating to product sales on the basis of control signals from the main control section 11.

Figure 3:
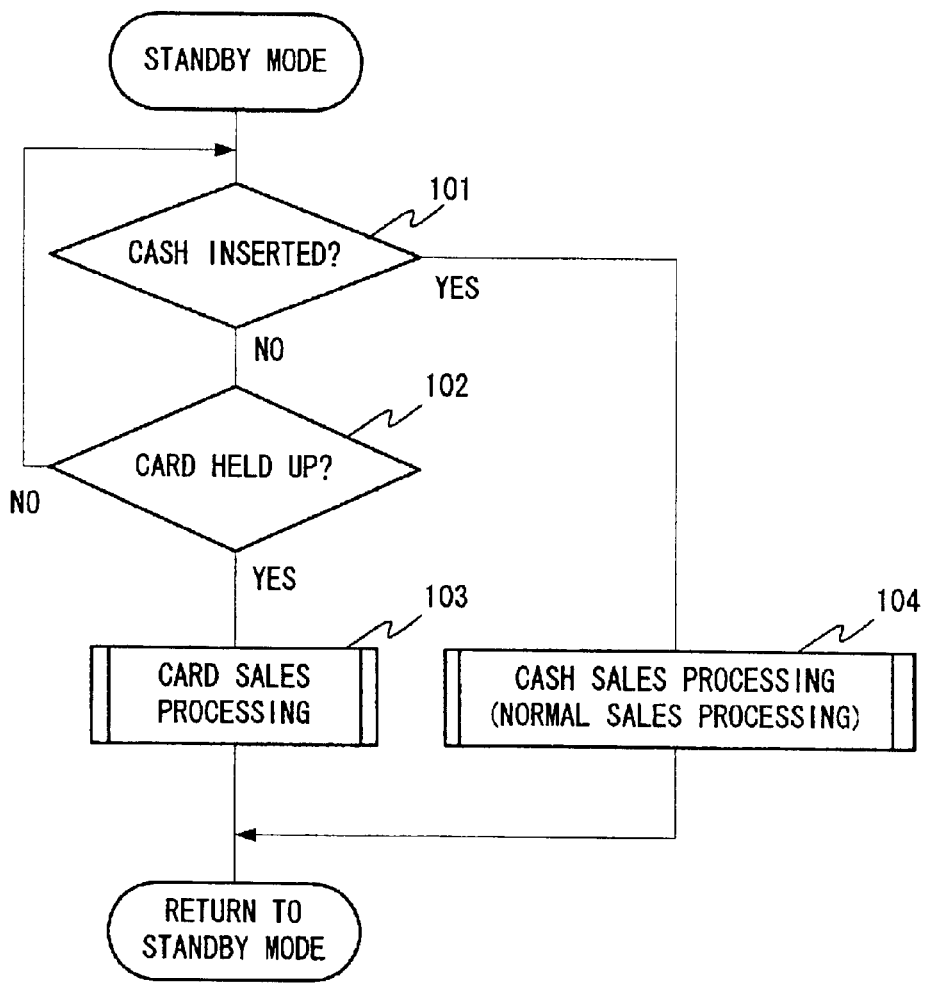
FIG. 3 is a flowchart explaining a sales mode determination method in the automatic vending machine according to this invention.

FIG. 3 is a flowchart explaining the flow of processing of the automatic vending machine in standby mode to the determination of the sales mode.

As is illustrated in FIG. 3, the sales mode of the automatic vending machine 10 is determined by whether cash is inserted or a non-contact IC card is held up to the automatic vending machine in standby mode. If cash is inserted (YES in step 101), cash sales mode for performing sales processing using cash (that is, sales processing similar to that of a typical automatic vending machine) is determined (step 104), and if a non-contact IC card is held up to the antenna section 7 (YES in step 102), card sales mode for performing sales processing using a non-contact IC card is determined (step 103).

Figure 4:
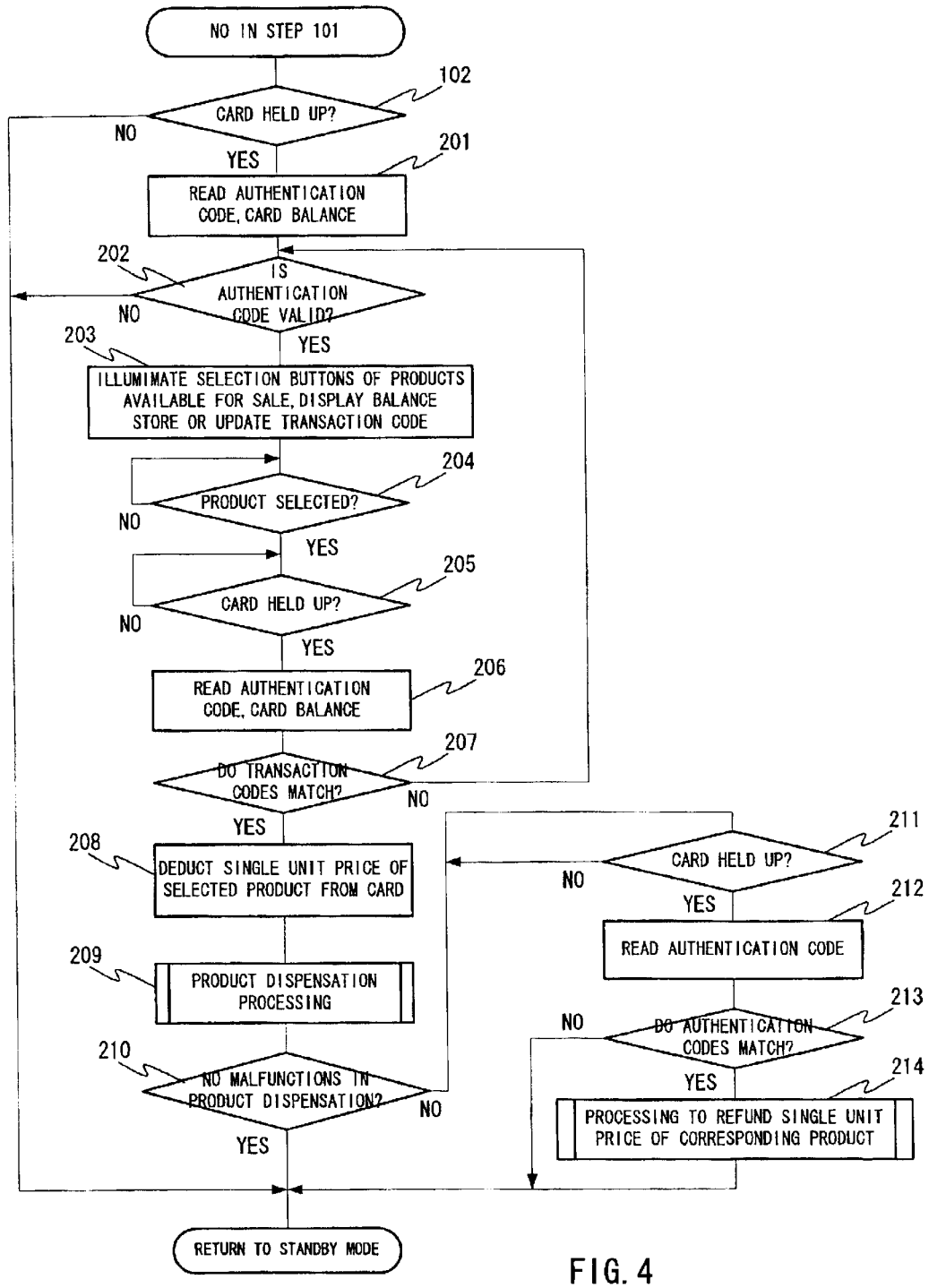
FIG. 4 is a flowchart explaining sales processing in card sales mode in the automatic vending machine according to this invention.

FIG. 4 is a flowchart explaining the flow of sales processing in the automatic vending machine 10 when in card sales mode.

When a non-contact IC card is held up to the antenna section 7 (YES in step 102), the card reader/writer 12 reads from the non-contact IC card an in-built authentication code and monetary amount information stored on the card and then notifies the main control section 11 thereof (step 201). The main control section 11 checks the authentication code read from the non-contact IC card by the card reader/writer 12 and makes a judgment based thereon as to the validity of the non-contact IC card (step 202). If the card is judged to be valid (YES in step 202), the sales mode lamp 42 is illuminated to indicate card sales mode, whereupon the read out monetary amount information is displayed on the display section 40 and the lamps of the product selection buttons 21 corresponding to products which are available for sale within this monetary amount are illuminated (step 203). The main control section 11 temporarily stores the authentication code and monetary amount information read from the non-contact IC card as a transaction code.

When one of the buttons from among the product selection buttons 21 with illuminated lamps is depressed (YES in step 204), the main control section 11 confirms the product to be sold by extinguishing the lamps of the product selection buttons other than the depressed product selection button 21, and then waits for the non-contact IC card to be held up to the antenna section 7 for a second time (step 205). When the non-contact IC card is held up to the antenna section 7 (YES in step 205), the card reader/writer 12 reads the authentication code and monetary amount information from the non-contact IC card and notifies the main control section 11 thereof (step 206). The main control section 11 compares the transaction code comprising the authentication code and monetary amount information read out the second time with the previously stored transaction code to judge whether or not the two transaction codes are identical (step 207). If the codes are identical (YES in step 207), the price of the product corresponding to the depressed product selection button 21 is deducted from the notified monetary amount information, whereby the monetary amount information stored on the non-contact IC card is updated (step 208). Thereafter, an order for product dispensation is given to the product dispensation processing section 14. The product dispensation processing section 14 receives the order from the main control section 11 and dispenses the product corresponding to the depressed product selection button 21 to the product dispensation port 6 (step 209).

If, on the other hand, the transaction code of the non-contact IC card which was held up following the depression of the product selection button 21 does not match the stored transaction code (NO in step 207), the main control section 11 checks the authentication code of the non-contact IC card which was held up following depression of the product selection button 21 (return to step 202), and if this authentication code is valid (YES in step 202), updates the stored transaction code (authentication code and monetary amount information) to the transaction code of the non-contact IC card which was held up following depression of the product selection button (step 203).

In other words, if the transaction code of the non-contact IC card which was held up prior to depression of the product selection button 21 and the transaction code of the non-contact IC card which was held up following depression of the product selection button 21 do not match, sales processing subject to the non-contact IC card which was held up prior to the depression of the product selection button 21 is canceled, whereupon sales processing is performed from step 202 with the non-contact IC card which was held up following depression of the product selection button 21 as the new transaction partner.

Note that the automatic vending machine 1 may also be immediately reset to standby mode when the transaction code of the non-contact IC card which was held up prior to depression of the product selection button 21 and the transaction code of the non-contact IC card which was held up following depression of the product selection button 21 do not match (NO in step 207).

When a product cannot be dispensed through the product dispensation port 6 due to product blockages or the like and regardless of the fact that the product has been selected and the price thereof charged from the non-contact IC card (NO in step 210), the main control section 11 informs the user of the malfunction by displaying such information on the display section 40 and waits for the non-contact IC card to be held up to the antenna section 7 (step 211). When the non-contact IC card is held up to the antenna section 7 (YES in step 211), the card reader/writer 12 reads the authentication code from the non-contact IC card and informs the main control section 11 thereof (step 212). The main control section 11 compares the notified authentication code and the previously stored authentication code (step 213), and if the two authentication codes match (YES in step 213), the price of the corresponding product is refunded to the non-contact IC card (step 214).

Note that the modes of awaiting depression of a product selection button 21 (step 203) and awaiting a non-contact IC card to be held up (steps 204, 211) are canceled after the elapse of a predetermined amount of time, whereby the automatic vending machine 10 is reset to standby mode.

Further, the modes of awaiting depression of a product selection button 21 (step 203) and awaiting a non-contact IC card to be held up (steps 204, 211) may be canceled upon detection of an operation of the return lever 33, and the automatic vending machine 10 may be reset to standby mode according to the will of the user. Also, a specialized reset button for resetting the automatic vending machine 10 may of course be provided.

Figure 5:
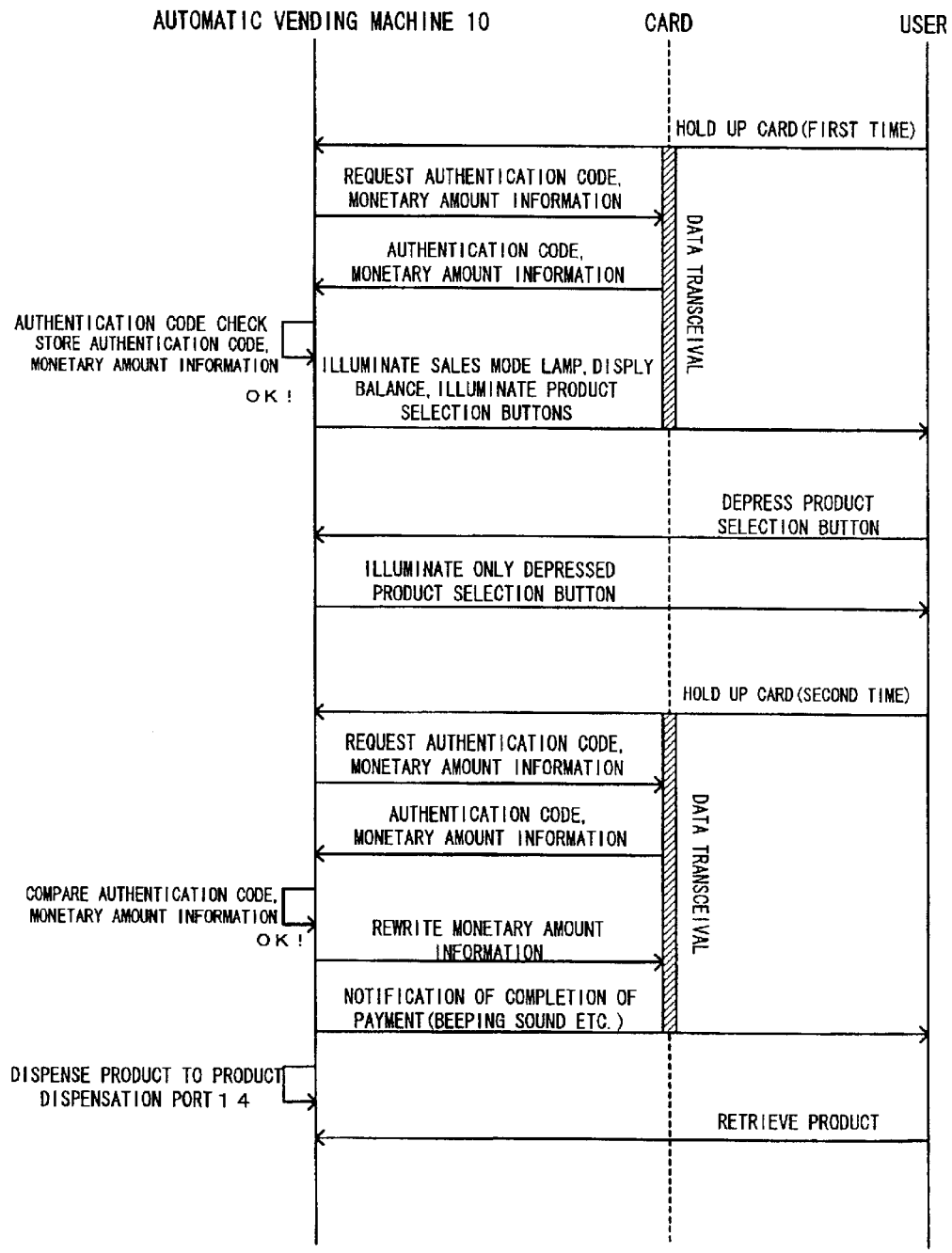
FIG. 5 is a sequence chart explaining in detail sales processing in card sales mode in the automatic vending machine according to this invention.

FIG. 5 is a view explaining a specific example of product sales by means of the automatic vending machine 10.

First, a user holds a non-contact IC card up to the antenna section 7 of the automatic vending machine 10 until the sales mode lamp 42 is illuminated.

The automatic vending machine 10 checks the validity of the card by reading the authentication code and monetary amount information from the non-contact IC card which has been held up to the antenna section 7. If the card is valid, the sales mode lamp 42 indicating card sales mode is illuminated, whereby the lamps of the product selection buttons 21 corresponding to the products which are available for sale are illuminated. The read out authentication code and monetary amount information are also stored.

The user depresses the product selection button 21 which corresponds to the desired product from among the illuminated product selection buttons 21.

The automatic vending machine 10 confirms the product to be sold by extinguishing the lamps of the product selection buttons 21 other than the depressed product selection button, or in other words by leaving only the lamp of the depressed product selection button 21 illuminated, and then requests the user to hold the non-contact IC card up to the antenna section 7 for a second time. This request may be performed by causing the touch panel surface of the antenna section 7 to flash or the like and then by illuminating the touch panel surface at the same time as the non-contact IC card is held up to the antenna section 7 so as to inform the user that the automatic vending machine 10 has moved into transaction status. Notification of the timing at which to hold up the card may of course be performed by another method (for example providing a separate transaction status lamp and illuminating this transaction status lamp to inform the user of the timing at which to hold up the card).

The user checks the product for which a sale has been confirmed by looking at the lamp of the product selection button 21, and then holds the non-contact IC card up to the antenna section 7. The card is held up continuously until notification as to the completion of payment processing is received from the automatic vending machine 10.

The automatic vending machine 10 reads the authentication code and monetary amount information from the non-contact IC card held up to the antenna section 7 and compares this code and information with the previously stored authentication code and monetary amount information. If the two match, the monetary amount information on the non-contact IC card is updated to the monetary amount which remains after the price of the selected product has been deducted from the read out monetary amount information, whereupon the user is informed as to the completion of payment processing. Then, the corresponding product is dispensed from the product dispensation port 16. Notification to the user of the completion of payment processing is performed, for example, by a beeping sound or by causing a change in the state of illumination of the touch surface of the antenna portion 7 or in the state of illumination of the separately provided transaction status lamp.

In other words, when a user wishes to purchase a product from the automatic vending machine 1, the user must hold the non-contact IC card up to the automatic vending machine 10 twice. The first time is in order to switch the automatic vending machine 10 to a state in which products are available for selection, and the second time is in order to implement payment to the automatic vending machine 10.

Accordingly, when the user simply wishes to check the balance on the non-contact IC card without purchasing a product, the non-contact IC card is held up to the automatic vending machine 10 only once, whereby the balance of the card is displayed on the display section 40. Since the monetary amount information of the card is not updated, the balance on the non-contact IC card can be checked freely.

Further, as was mentioned briefly in the above embodiment, a transaction status lamp for displaying the status of the transaction with the non-contact IC card may be provided. For example, this transaction status lamp is extinguished when the automatic vending machine 10 is in standby mode and illuminated when the non-contact IC card is held up such that the automatic vending machine 10 moves from standby mode to awaiting product selection status. When the product has been selected and the automatic vending machine 10 is waiting for the non-contact IC card to be held up for the purpose of payment, the lamp is caused to flash, thereby informing the user that the automatic vending machine 10 has entered transaction status. Note that instead of the transaction status lamp, light may be emitted from the touch surface of the antenna section 7.

Further, an example using a non-contact IC card was explained in the above embodiment. However, the present invention may also be applied to wireless communications using IrDA (optical communications and the like) installed in a portable communications terminal (a portable telephone or the like).

More specifically, by constructing the antenna section 7 of the automatic vending machine 10 from an IrDA interface comprising an infrared transceiving element or the like, the sales method described in the above embodiment can be applied without further modification to sales using IrDA installed in a portable communications terminal.

What is claimed is:

1. An automatic vending machine comprising:
   short range communication means for performing short range communication with a communication medium which is carried by a user;
   reader/writer means for reading from the communication medium via the short range communication means an authentication code for this communication medium and monetary amount information stored on this communication medium, and for rewriting the monetary amount information stored on the communication medium following a sale of a product;

storage means for temporarily storing the authentication code and the monetary amount information read out from the communication medium by the reader/writer means;

product dispensation means for dispensing a product; and control means in which a judgment is made as to whether or not the sale of a product is possible on the basis of the authentication code and monetary amount information read out from the communication medium by the short range communication means, whereupon, if the sale is possible, this authentication code and monetary amount information are stored in the storage means and the selection of a product is awaited, and in which the authentication code and monetary amount information of the communication medium are read for a second time by the short range communication means following the selection of a product, whereby, if the authentication code and monetary amount information read out for the second time and the authentication code and monetary amount information stored in the storage means match, the monetary amount information stored in the communication medium is updated to monetary amount information obtained by deducting a price of the selected product from the monetary amount information which was read for the second time, and, following the update of the monetary amount information, the product is dispensed by the product dispensation means.

2. The automatic vending machine according to claim 1, further comprising means which, when the product cannot be dispensed by the product dispensation means, reads the authentication code of the communication medium from the communication medium for a second time, and which, if the read out authentication code and the authentication code stored in the storage means match, adds the price of the product which could not be dispensed to the monetary amount information on the communication medium.

3. The automatic vending machine according to claim 1, wherein the communication medium comprises a non-contact IC card, and the short range communication means reads from the non-contact IC card an authentication code of the non-contact IC card and monetary amount information stored on the non-contact IC card when the non-contact IC card is within an effective distance of radio waves emitted from the short range communication means, and rewrites the monetary amount information stored on the non-contact IC card following the sale of a product.

4. The automatic vending machine according to claim 2, wherein an effective distance from radio waves emitted by the short range communication means is several centimeters.

5. The automatic vending machine according to claim 1, wherein the communication medium comprises a portable communication terminal having infrared communication means, and wherein the short range communication means performs infrared communications with the infrared communication means of the portable communication terminal to read from the portable communication terminal an authentication code of the portable communication terminal and monetary amount information stored on the portable communication terminal, and rewrites the monetary amount information stored in the portable communication terminal following the sale of a product.

6. A sales method of an automatic vending machine for selling a product by performing payment processing by means of short range communication with a communication medium which is carried by a user, comprising:

a first step of reading an authentication code of the communication medium and monetary amount information stored on the communication medium from the communication medium;

a second step of judging whether or not the sale of a product is possible based on the authentication code and monetary amount information read in the first step;

a third step of, if the sale of a product is possible in the second step, storing the authentication code and monetary amount information and awaiting the selection of a product;

a fourth step of selecting a product;

a fifth step of reading the authentication code and monetary amount information of the communication medium for a second time following the selection of a product in the fourth step;

a sixth step of comparing the authentication code and monetary amount information which were read for a second time in the fifth step and the stored authentication code and monetary amount information;

a seventh step of, if the authentication code and monetary amount information which were read for a second time and the stored authentication code and monetary amount information match in the sixth step, updating the monetary amount information stored on the communication medium to monetary amount information obtained by deducting the price of the selected product from the monetary amount information which was read for a second time; and an eighth step of dispensing the product following the update of the monetary amount information in the seventh step.

7. The sales method for an automatic vending machine according to claim 6, further comprises:

a ninth step of, if a product cannot be dispensed in the eighth step, reading the authentication code of the communication medium from the communication medium for a second time; and a tenth step of, if the authentication code read out in the ninth step and the stored authentication code match, adding the price of the product which could not be dispensed to the monetary amount information on the communication medium.

* * * * *